US012282094B2

(12) United States Patent
Murakami (10) Patent No.: US 12,282,094 B2
(45) Date of Patent: Apr. 22, 2025

(54) METHOD FOR MEASURING DISTANCE OF IMAGE DISPLAYED ON TELEVISION CAMERA

(71) Applicant: Naoyuki Murakami, Fujisawa (JP)

(72) Inventor: Naoyuki Murakami, Fujisawa (JP)

(73) Assignee: Murakami Naoyuki, Kanagawa (JP)

( * ) Notice: Subject to any disclaimer, the term of this patent is extended or adjusted under 35 U.S.C. 154(b) by 967 days.

(21) Appl. No.: 17/204,912

(22) Filed: Mar. 17, 2021

(65) Prior Publication Data

US 2021/0199800 A1 Jul. 1, 2021

Related U.S. Application Data

(63) Continuation of application No. PCT/JP2019/036238, filed on Sep. 13, 2019.

(30) Foreign Application Priority Data

Sep. 18, 2018 (JP) .................... 2018-174323

(51) Int. Cl.
*G01S 17/08* (2006.01)
*G01S 17/86* (2020.01)
*G01S 17/89* (2020.01)
*G06T 7/70* (2017.01)

(52) U.S. Cl.
CPC .............. *G01S 17/08* (2013.01); *G01S 17/86* (2020.01); *G01S 17/89* (2013.01); *G06T 7/70* (2017.01)

(58) Field of Classification Search
None
See application file for complete search history.

(56) References Cited

U.S. PATENT DOCUMENTS

| 5,898,484 A | 4/1999 | Harris |
| 2014/0043309 A1 | 2/2014 | Go et al. |
| 2015/0181099 A1 | 6/2015 | Van der Tempel |
| 2015/0185008 A1 | 7/2015 | Nobuyuki |
| 2015/0243017 A1* | 8/2015 | Fujimoto ................ G01S 11/12 348/142 |

(Continued)

FOREIGN PATENT DOCUMENTS

| JP | 2001047269 A | 2/2001 |
| JP | 2001147269 A | 5/2001 |

(Continued)

OTHER PUBLICATIONS

WIPO, International Search Report in corresponding PCT application PCT/JP2019/036238, Mar. 10, 2020.

(Continued)

*Primary Examiner* — Luke D Ratcliffe (57) ABSTRACT

Provided is an environment in which balance information can be easily confirmed when An LED light emitting element unit that controls light emission for each LED light emitting element that is similar to an image element of a television camera is required. A luminous intensity measuring element unit to be controlled and measured is necessary for each luminous intensity measuring element which is similar to an image element of a television camera. The present invention relates to an electronic device that can be manufactured by a current electronic device manufacturing technology.

11 Claims, 13 Drawing Sheets

(56) References Cited

U.S. PATENT DOCUMENTS

| | | | |
|---|---|---|---|
| 2015/0253428 A1* | 9/2015 | Holz | G01S 7/483 |
| | | | 356/5.01 |
| 2016/0006914 A1* | 1/2016 | Neumann | G06F 3/017 |
| | | | 348/370 |
| 2016/0259057 A1 | 9/2016 | Ito | |
| 2016/0290790 A1 | 10/2016 | Wu | |
| 2017/0045616 A1 | 2/2017 | Masuda | |
| 2018/0094919 A1* | 4/2018 | Narasimham | H04N 13/398 |
| 2018/0275278 A1 | 9/2018 | Yamada | |

FOREIGN PATENT DOCUMENTS

| | | |
|---|---|---|
| JP | 2007156917 A | 6/2007 |
| JP | 6253973 B2 | 12/2017 |
| JP | 2018119942 A | 8/2018 |
| WO | 2018042801 A1 | 3/2018 |

OTHER PUBLICATIONS

WIPO, Written Opinion of the ISA in corresponding PCT application PCT/JP2019/036238, Mar. 10, 2020.

* cited by examiner

METHOD FOR MEASURING DISTANCE OF IMAGE DISPLAYED ON TELEVISION CAMERA

RELATED APPLICATIONS

This application claims priority under 35 U.S.C. § 120 to, and is a continuation of, co-pending International Application PCT/JP2019/036238, filed Sep. 13, 2019 and designating the US, which claims priority to Japanese Application 2018-174323, filed Sep. 18, 2018, such Japanese Application also being claimed priority to under 35 U.S.C. § 119. These Japanese and International applications are incorporated by reference herein in their entireties.

BACKGROUND

Field

LED light emission technology, light intensity measurement technology, image processing technology, image device manufacturing technology, LED light emitting device manufacturing technology, light intensity measurement device manufacturing technology, distance measurement technology, and viewer soft waste.

The distance measurement of the complete autonomous driving of the automobile or the complete autonomous driving of the robot requires more accurate distance measurement.

By recognizing the direction and the distance in which the image is recognized by a numerical value, it is possible to deal with a numerical value.

Development of an LED light emitting element unit and a light intensity measuring element unit including a novel LED light emitting element and an altitude measuring element.

SUMMARY

In order to measure a distance to a subject, which is obtained by analyzing an image of a television camera, a position of the subject and a position of an image element of the television camera that reflects the subject are set as a position at which light is emitted, a position of the subject, and a position of the subject and a position at which the reflected light is measured, relating to an optical lens of the television camera, and the distance is calculated based on a time at which the reflected light is measured.

A technique for measuring a distance to a subject photographed by a television camera and analyzed by an image.

The distance to the subject is measured, and the position of the subject is recognized.

A three-dimensional image of a subject is recognized.

The object of the space photographed by the television camera is grasped as the direction and the distance of the image position on which the image analysis is performed.

BRIEF DESCRIPTION OF DRAWINGS

By value conversion, it is possible to quantify the correspondence with the subject. A simple description of the drawings will be provided.

The reflected light from the luminous intensity measuring device 40 of the luminous intensity measuring device is transmitted through the optical lens of the luminous intensity measuring device 40 of the luminous intensity measuring device, and the reflected light is measured at the position of each luminous intensity measuring device.

DETAILED DESCRIPTION

According to the present invention, an object to be measured is irradiated with the strongest light by condensing the emitted light by an optical lens.

By irradiating the subject to be measured with the strongest light, the strongest light is reflected from the subject.

The strongest reflected light is condensed by the optical lens, and the reflected light is measured at the strongest position.

The strongest reflected light can be measured from the emitted light.

The distance between the subject and the subject is measured from the emission time by a time difference obtained by measuring the reflected light.

The light emission position and the measurement position are derived from the position of the image element of the television camera in which the subject is shown, by performing image analysis on the screen photographed by the television camera.

The position at which the light is focused on the subject and the light emission position and the position at which the reflected light from the subject is collected and measured can also be the position of the optical lens similar to that of the television camera and the position of the similar image element.

From a position of an image obtained by performing image analysis on a subject photographed by a television camera on a television camera monitor screen, an image element showing the subject in which the lens of the television camera is transparent and the image is changed to an image signal can be specified from the position of the image of the subject on the television camera monitor screen.

When the LED light emitting element emits light at the specified position of the image element, the light of the light emitting element permeates the lens of the television camera, and is collected at the position of the subject photographed by the television camera.

When the light emitted from the LED light emitting element is condensed, the strongest light hits the subject, and the strongest reflected light from the subject permeates the lens of the television camera and is reflected by the image element that reflects the position of the image analyzed on the television camera monitor screen. The LED light emitting element is caused to emit light to measure the reflected light, the LED light emitting element is caused to emit light, and a distance to the object is measured from a time until the reflected light is measured.

Instead of the image element of the television camera, it is possible to project light to the same subject as that of the television camera in the light projecting device in which the LED light emitting element is arranged and is similar to the television camera that photographs the object at a focal length.

In addition, it is possible to measure the reflected light from the subject which is the same as that of the television camera in the light receiver, which is similar to the television camera at a focal length.

EXAMPLE

The present invention measures a distance to a subject 4 in a space captured by the image analysis television camera 1.

Figure 1:
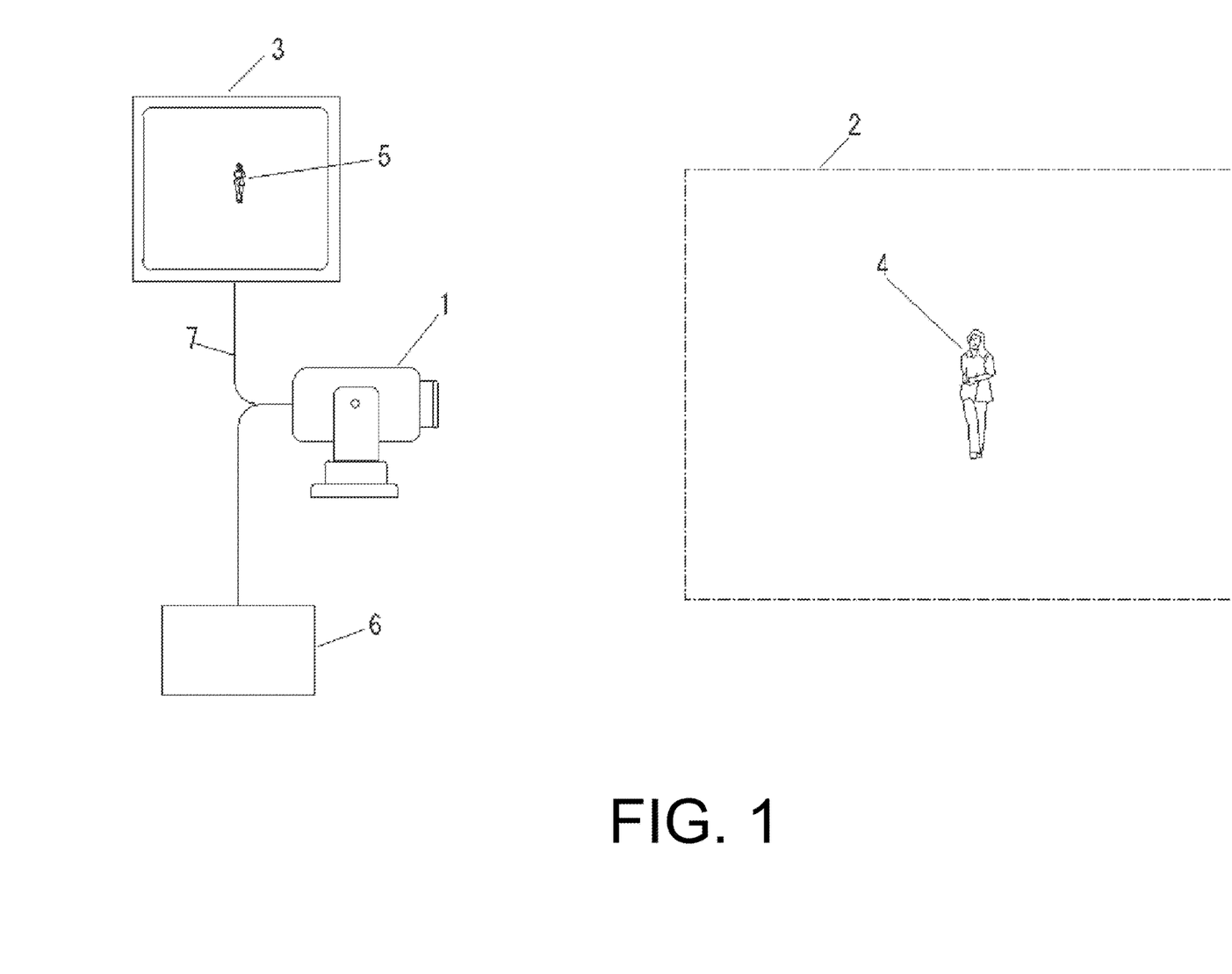
FIG. 1 is an explanatory diagram of a subject 5 subjected to image analysis on a television camera monitor 3 screen obtained by performing image analysis on a subject 4 photographed by an image analysis television camera 1.
Figure 2:
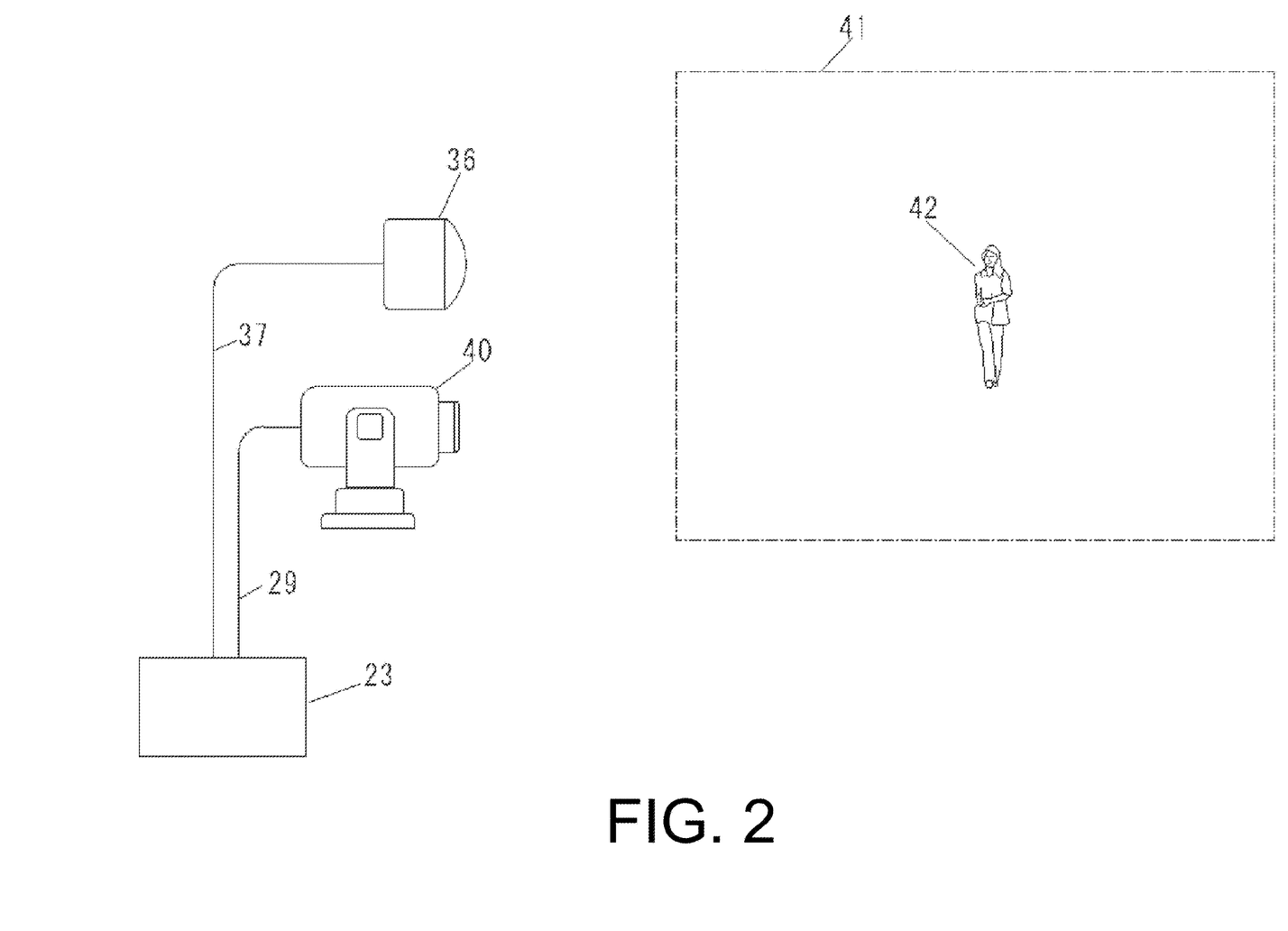
FIG. 2 is an explanatory diagram of an image element unit 8 obtained by performing image analysis on a subject 4 photographed by the image analysis television camera 1 and a position 9 of an image element of the subject subjected to the image analysis.

In FIG. 1, the position of the image of the subject 4 photographed by the image analysis television camera 1 can be recognized as the position 9 of the image element of the subject subjected to the image analysis constituting the image element of the image element unit 8 of the image element of the image analysis television camera 1 of the subject 5 subjected to the image analysis shown in the television camera monitor 3.

Figure 3:
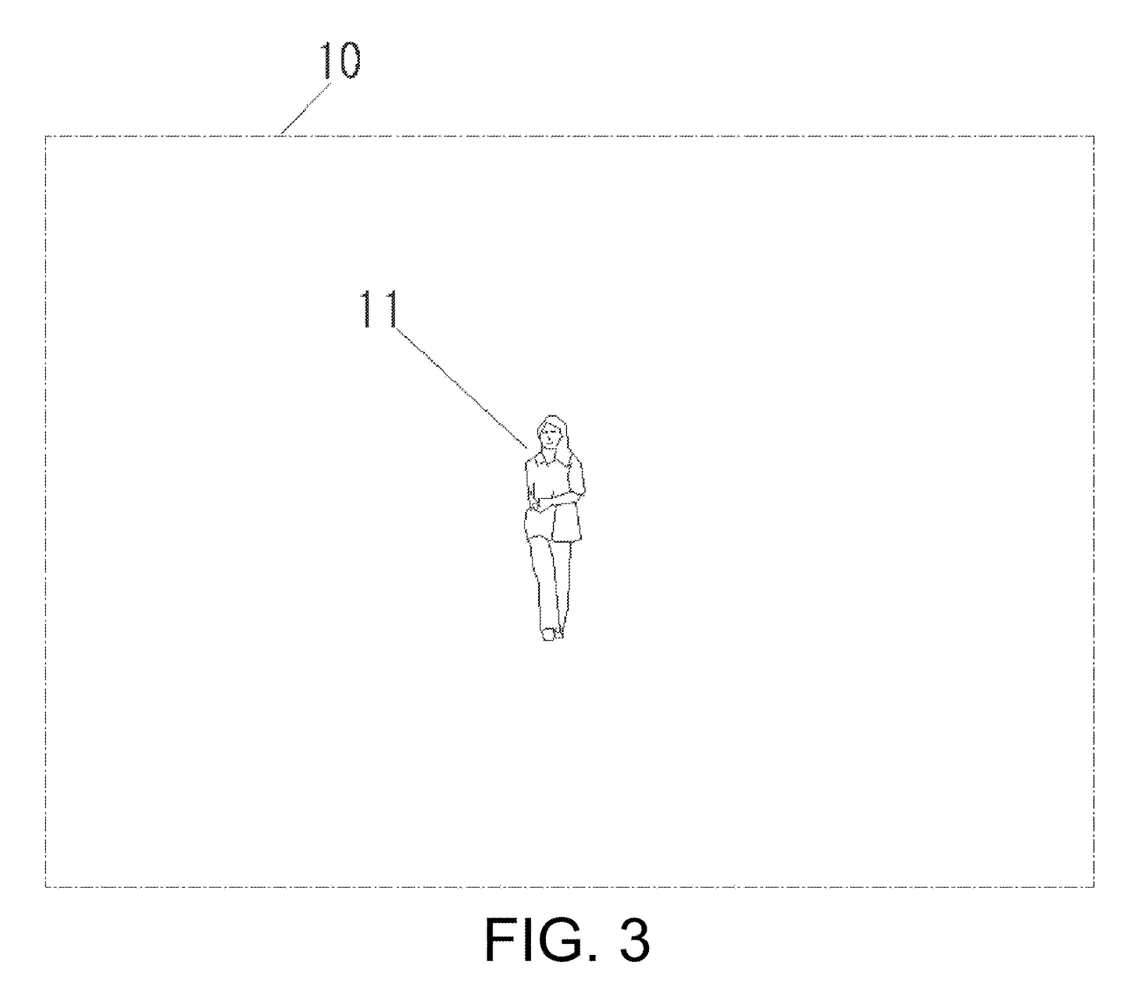
FIG. 3 is an explanatory diagram of a position where the LED light emitting element unit 10 is arranged at the same position as the image element unit 8 obtained by performing image analysis on a subject photographed by the image analysis television camera 1, and the LED light emitting element 11 at the position 9 of the image element of the subject subjected to the image analysis is emitted to irradiate the subject 4.

An optical mechanism of the image analysis television camera 1 is used in which the light emitted from the LED light emitting element 11 in FIG. 3 installed at the recognized position 9 of the subject on which the image analysis of the image analysis television camera 1 is recognized permeates the optical mechanism of the image analysis television camera 1 and is condensed at the position of the subject 4 to illuminate the subject 4.

Figure 4:
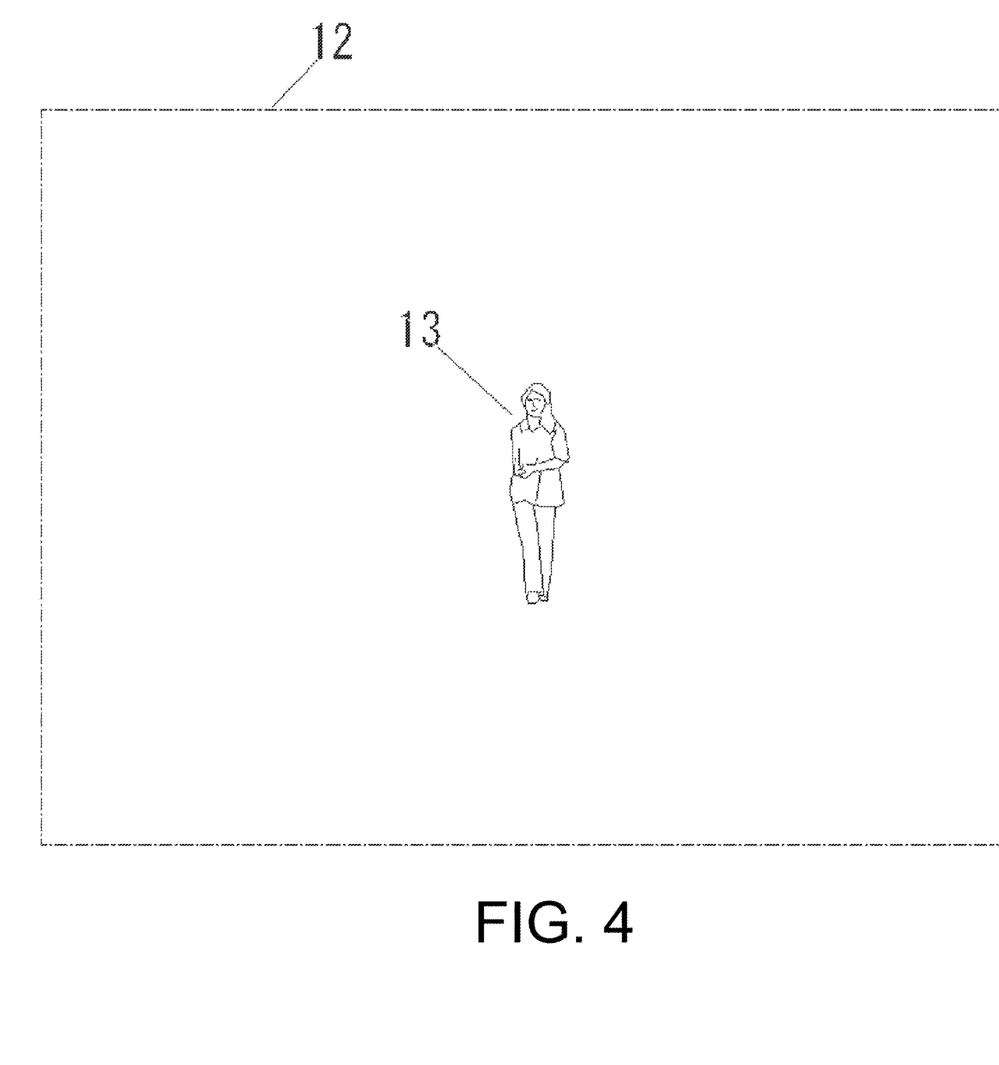
FIG. 4 is an explanatory diagram of a position where the luminous intensity measuring element unit 12 is arranged at the same position as that of the image element unit 8 obtained by analyzing the image of the object 4 photographed by the image analysis television camera 1, and reflected light from the object is measured by the luminous intensity measuring element 13 at the position 9 of the image element of the object subjected to the image analysis.

In the light intensity measuring element 13 of FIG. 4 which is installed at the recognized position of the position 9 of the image element of the subject on which the image analysis of the image analysis television camera 1 is performed, the luminous intensity measured at the position is measured through the optical mechanism of the image analysis television camera 1 by passing through the optical mechanism of the image analysis television camera 1.

The LED light emitting element 11 and the light intensity measuring element 13 are elements that can be individually operated.

Figure 5:
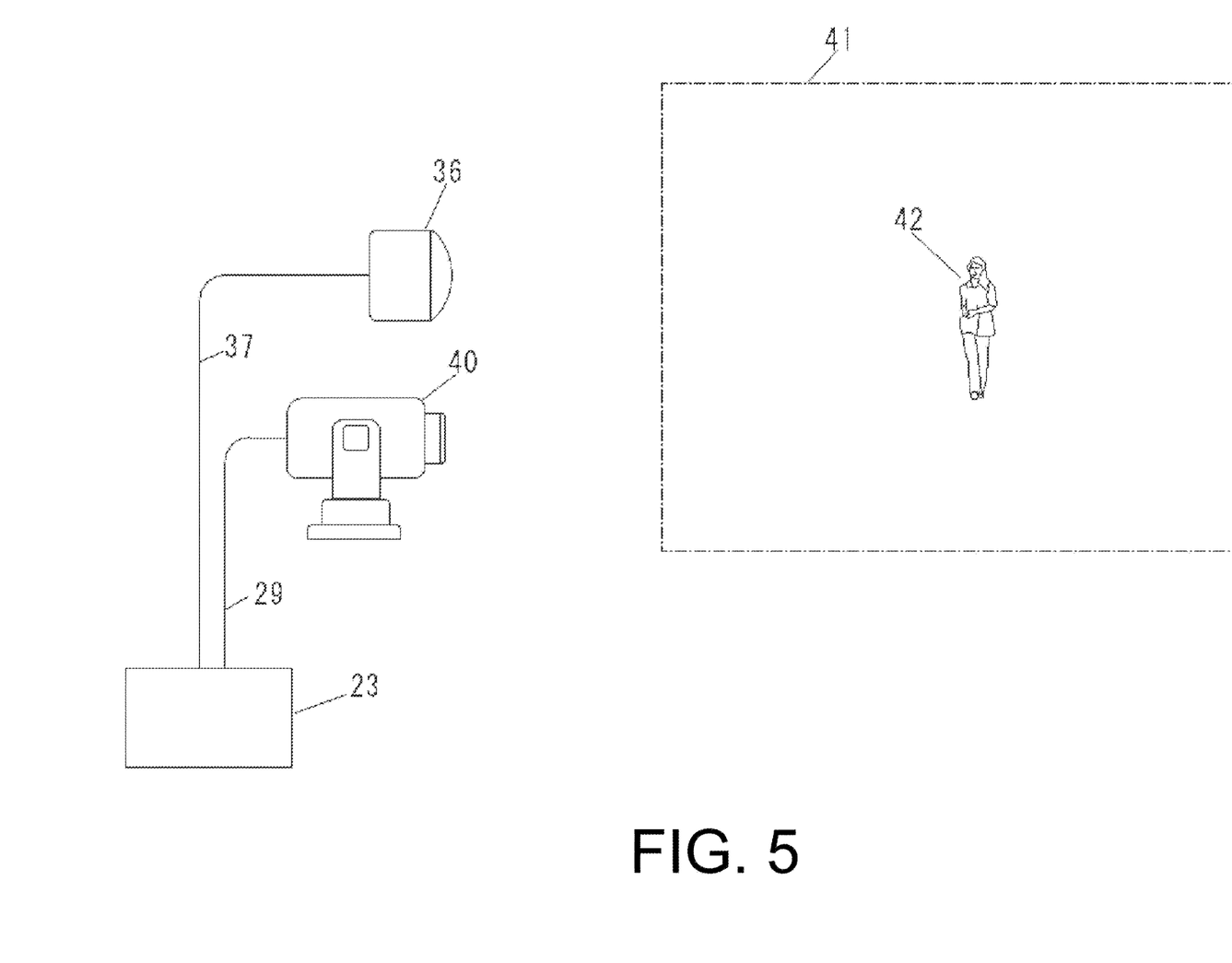
FIG. 5 is an explanatory diagram for irradiating a subject 4 with a light projector 14 of an LED light emitting device similar to the image analysis television camera 1.

In the projector 14 of the LED light emitting element in FIG. 5 of the optical mechanism having the same focal length as that of the image analysis television camera 1 in the same direction as the image analysis television camera 1, the eight LED light emitting element units are arranged so as to be similar to the image element unit 8 obtained by analyzing the image of the object 4 photographed by the image analysis television camera 1, the LED light emitting element 11 at the recognized position similar to the position 9 of the image element of the object subjected to the image analysis photographed by the image analysis television camera 1 is emitted, and the light is transmitted through the optical mechanism having the same focal length as that of the image analysis television camera 1 to be condensed on the object 4 and irradiated.

Figure 6:
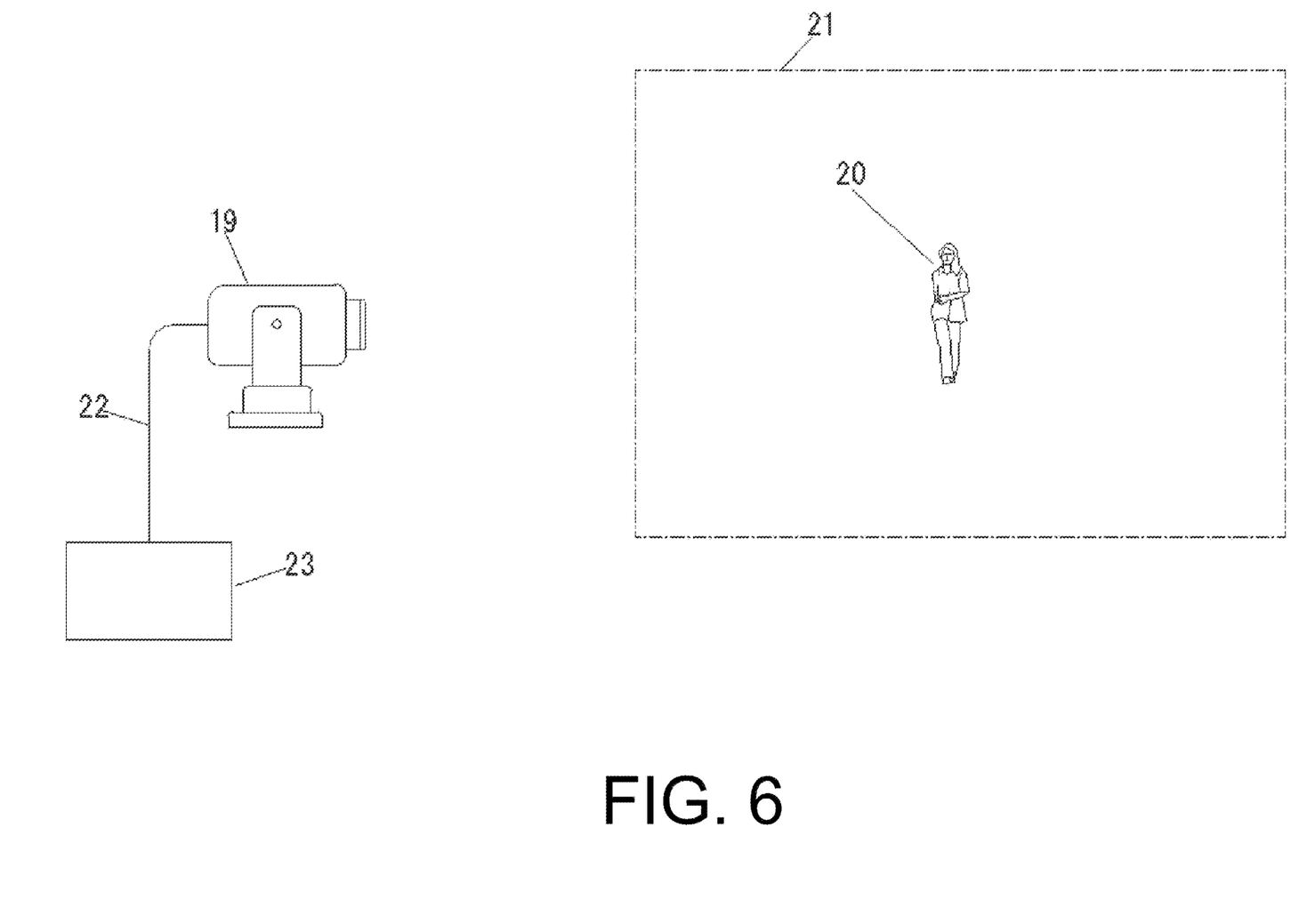
FIG. 6 is an explanatory diagram for measuring reflected light from a subject 4 with a light intensity measuring machine of a light intensity measuring element 13 similar to the image analysis television camera 1.

In the luminous intensity measuring device 19 of the luminous intensity measuring element in FIG. 6 of the optical mechanism having the same focal length as that of the image analysis television camera 1 in the same direction as the image analysis television camera 1, the luminous intensity measuring element unit 12 is arranged so as to be similar to the image element unit 8 obtained by image-analyzing the object 4 photographed by the image analysis television camera 1, and the luminous intensity measuring element 13 at the recognized position similar to the position 9 of the image element of the photographed subject photographed by the image analysis television camera 1 is transmitted through the optical mechanism having the same focal length as that of the image analysis television camera 1 to measure the luminous intensity of the reflected light.

Figure 7:
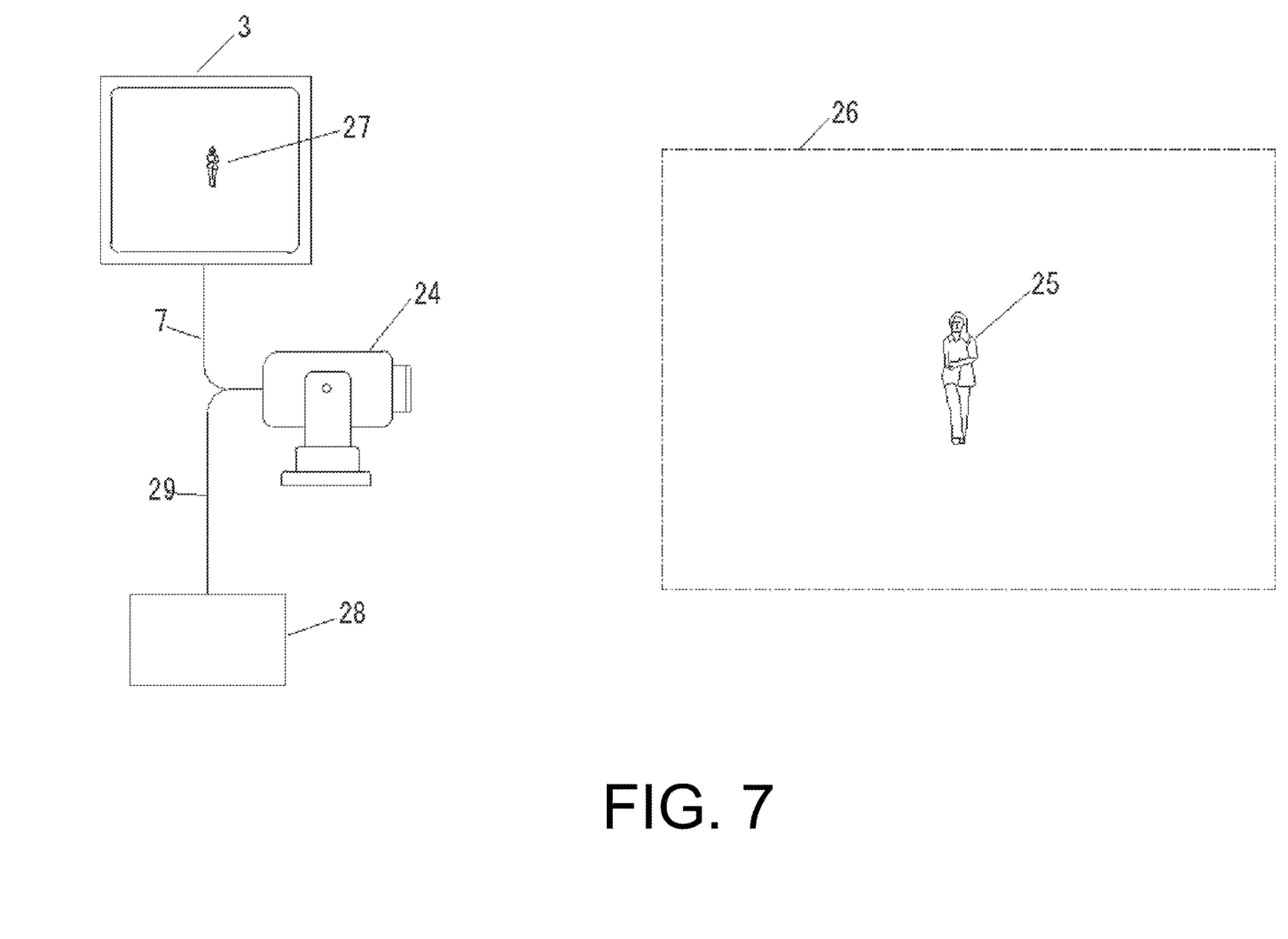
FIG. 7 is an explanatory view of a measuring device 24 in which an LED light emitting element 11 at a position 9 of an image element of a subject subjected to image analysis on the subject 4 photographed by the image analysis television camera 1 is caused to emit light, the subject 4 is irradiated with light, and the reflected light from the subject 4 is measured by the light intensity measuring element 13 at the position 9 of the image element of the subject subjected to the image analysis, and the LED light emitting element and the luminous intensity measuring element are incorporated in an image analysis television camera which measures the reflected light.
Figure 8:
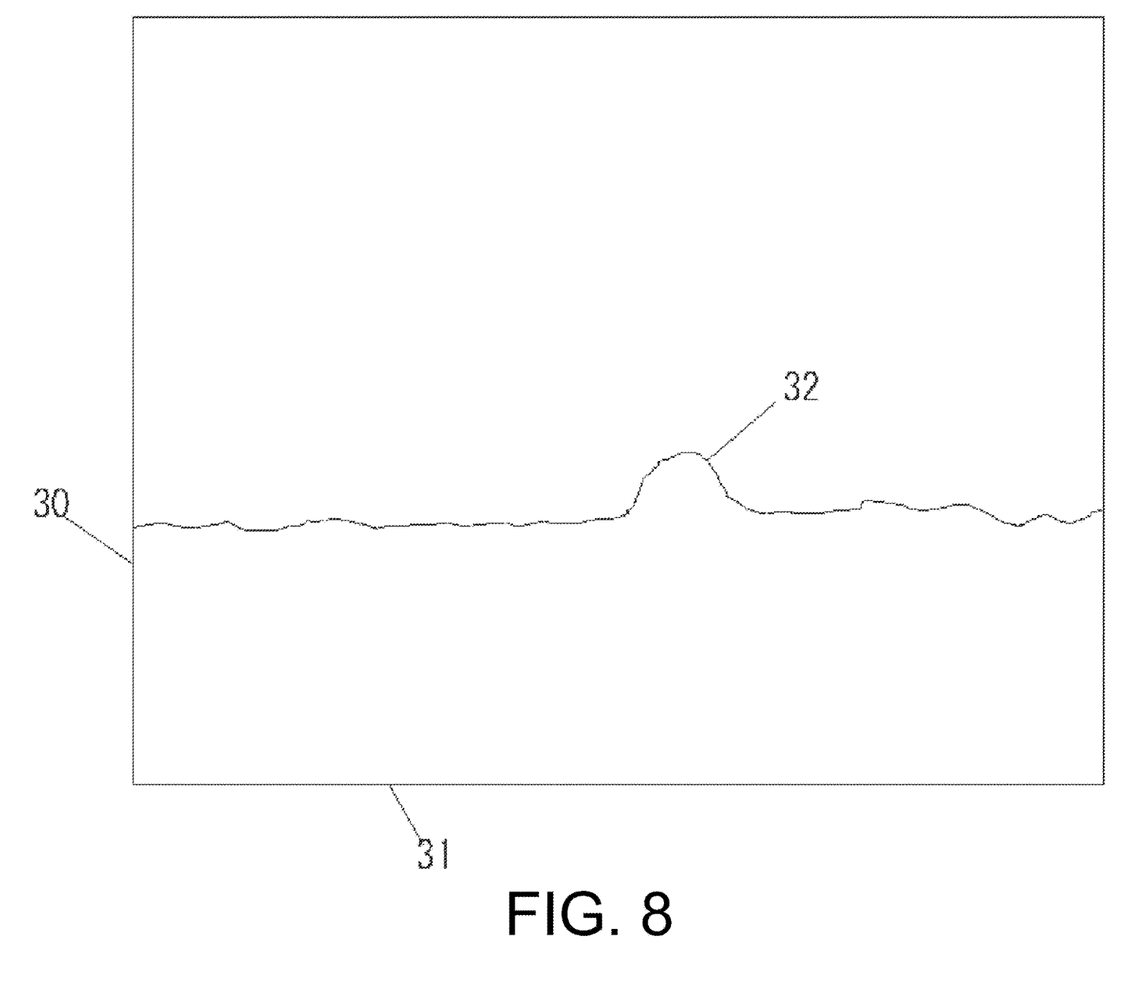
FIG. 8 is an explanatory diagram of the passage of time from the time when the LED light emitting element 11 emits light to irradiate the subject 4 and the time when the reflected light is measured from the emitted time.

The image analysis television camera 1 includes an LED light emitting element unit 10 and a light intensity measuring element unit 12 at the same position as the image element unit 8 obtained by performing image analysis on the object 4 photographed by the image analysis television camera 1, causes the LED light emitting element 11 at the position 9 of the image element of the object subjected to the image analysis photographed by the image analysis television camera 1 to emit light, permeates the lens of the image analysis television camera 1 and irradiates the object 4 with light, and condenses the reflected light from the object 4 by the light intensity measuring element 13 at the position 9 of the image element of the object subjected to image analysis through the lens of the image analysis television camera 1 to measure the luminous intensity, and is a measuring machine of the image element, the LED light emitting element, and the luminous intensity measuring element of the 24 image analysis television camera of FIG. 7.

The LED light emitting element 11 at the position 9 of the image element of the subject subjected to the image analysis photographed by the image analysis television camera 1 is caused to emit light, and the emitted light permeates the lens of the image analysis television camera 1 and is condensed on the subject 4 and irradiated.

The light reflected from the irradiated object 4 permeates the lens of the image analysis television camera 1, and the luminous intensity is measured by the luminous intensity measuring element 13 at a position where the focal point of the reflected light is matched with the position 9 of the image element of the object subjected to the image analysis.

The light of the LED light emitting element 11 is condensed and irradiated at the position of the object, and the reflected light from the object is also condensed at the position of the light intensity measuring element 13, and the light is measured at the position to enable the measurement of the light degree.

Figure 9:
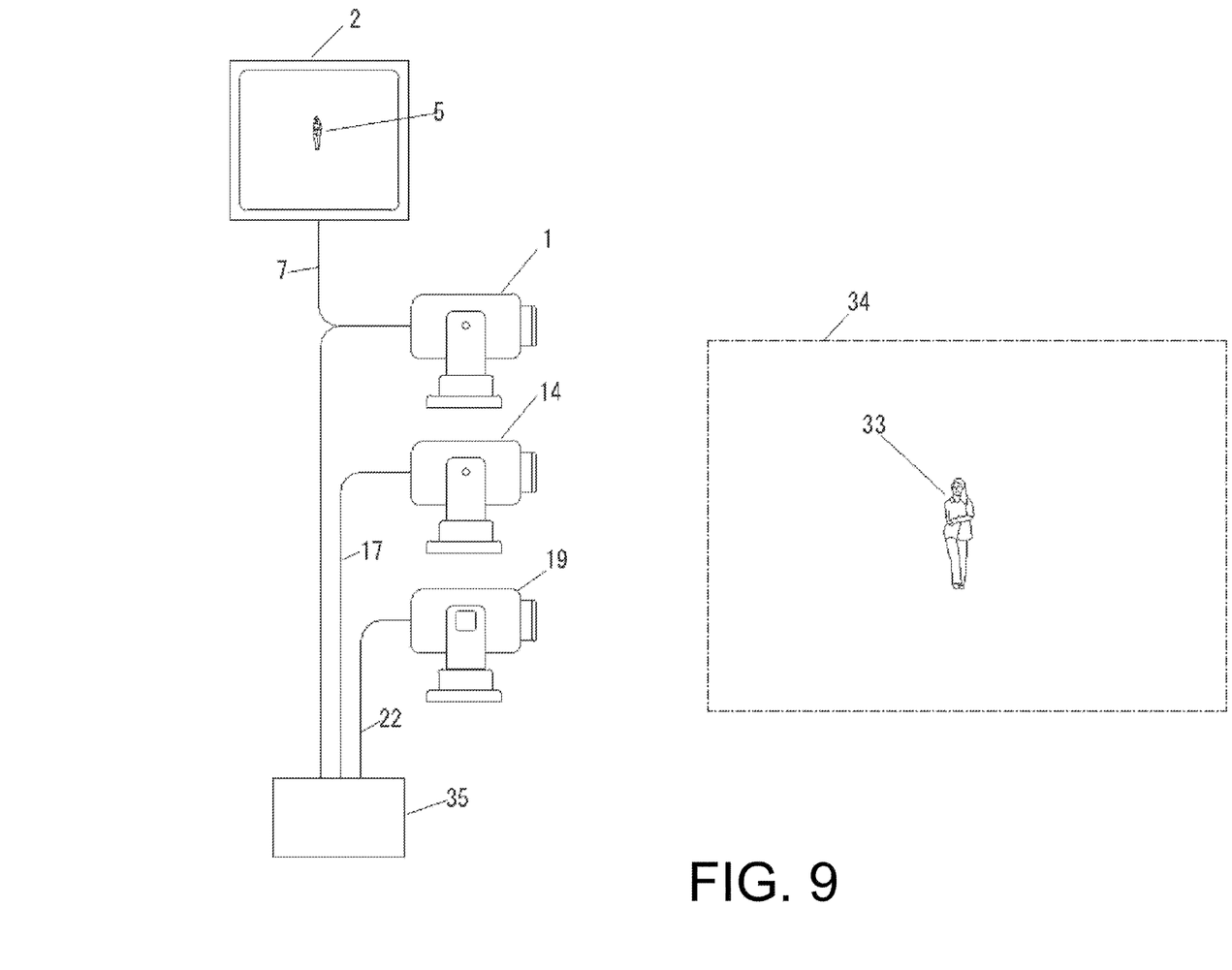
FIG. 9 is an explanatory diagram of the light projecting device 14 of the LED light emitting element that photographs the subject 4 with the image analysis television camera 1 and recognizes the position 9 of the image element of the subject subjected to the image analysis, thereby causing the LED light emitting element 11 at the same position as the recognized image element to emit light, and the light intensity measuring device 19 of the light intensity measuring element that measures the reflected light with the light intensity measuring element 13 at the recognized position.

A subject 33 measured by the image analysis television camera 1 of FIG. 9 is photographed, and the position of the image element shown in the subject in the unit of the image element of the image analysis television camera 1 showing the subject on the television camera monitor 3 screen is recognized.

In the same direction as the image analysis television camera 1, the LED light emitting element unit 10 is arranged at the same position as that of the image analysis television camera 1 by the light projection unit 14 of the LED light emitting element of FIG. 9 of the optical mechanism having the same focal length as that of the image analysis television camera 1, the LED light emitting element 11 at the recognized position is caused to emit light, and the light transmitted through the optical lens similar to the image analysis television camera 1 is condensed on the subject of 33 measurement and irradiated.

In the same direction as the image analysis television camera 1, the light intensity measuring device 19 of the light intensity measuring element of FIG. 9 of the optical mechanism having the same focal length as that of the image analysis television camera 1 is arranged with a 12-light intensity measuring element unit at the same position similar to that of the image analyzing television camera 1, and the reflected light from the object of 33 measurement is transmitted through an optical lens similar to that of the image analysis television camera 1, and is measured by the luminous intensity measuring element 13 at the recognized position.

Figure 10:
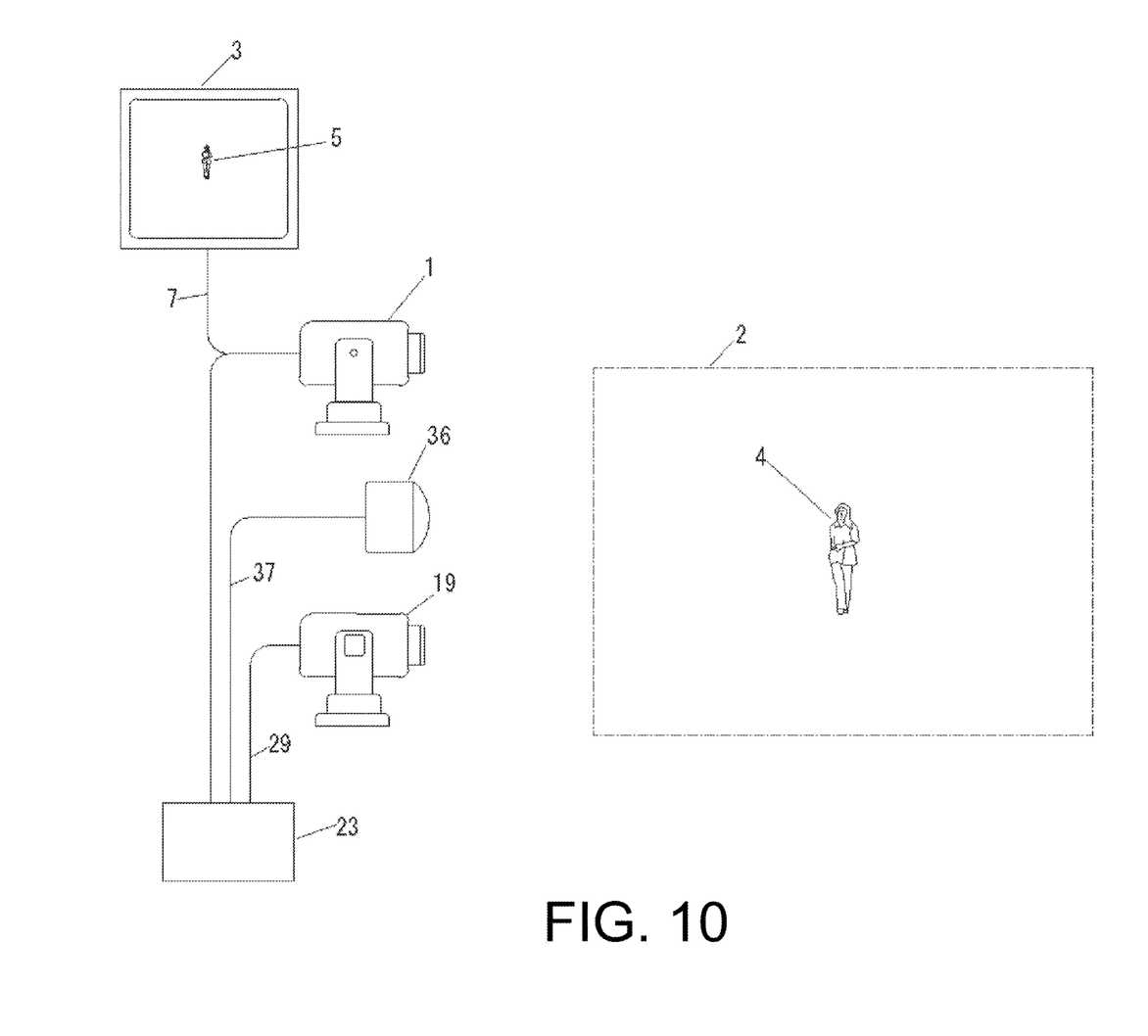
FIG. 10 is an explanatory diagram of a luminous intensity measuring device 19 of a luminous intensity measuring element that photographs an object 4 with an image analysis television camera 1 and recognizes a position 9 of an image element of an object subjected to image analysis, thereby irradiating the object 4 with a 36 LED light projecting device and measuring the reflected light by the luminous intensity measuring element 13 at the recognized position.

The subject 4 photographed by the image analysis television camera 1 is irradiated with a 36 LED light projecting device of FIG. 10 in the same direction as the image analysis television camera 1, and the irradiated reflected light from the subject 4 is directed in the same direction as the image analysis television camera 1, and an optical lens similar to that of the image analysis television camera 1 is transmitted through an optical lens similar to that of the image analysis television camera 1 to measure the luminous intensity of the reflection, and the luminous intensity measurement element unit 12 is arranged at the same position as that of the image element unit 8 photographed by the image analysis television camera 1, and the luminous intensity of the reflected light is measured by the luminous intensity measurement element 13 at a position corresponding to the recognized position of the object 4 photographed by the image analysis television camera 1.

Figure 11:
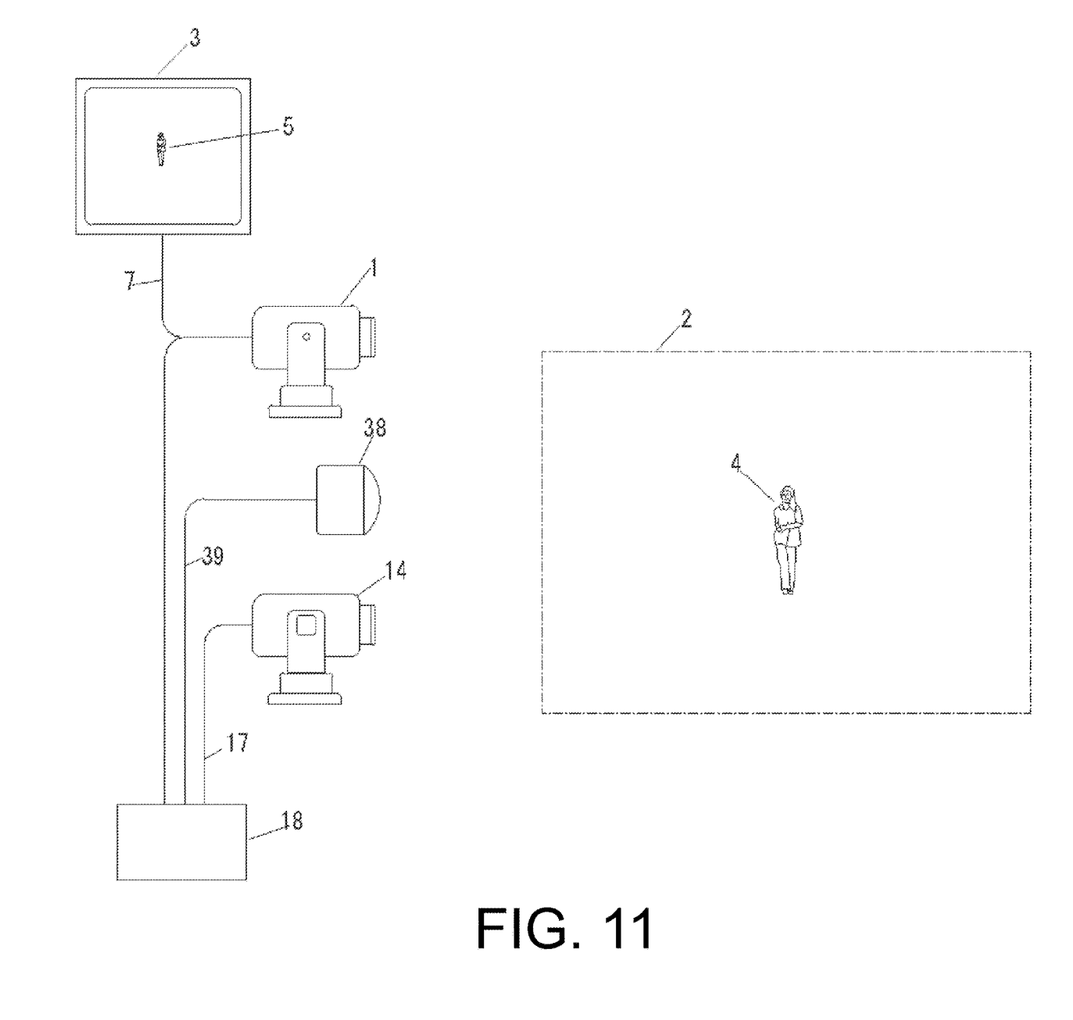
FIG. 11 is an explanatory diagram for photographing the subject 4 with the image analysis television camera 1, recognizing the position 9 of the image element of the subject on which the image analysis is performed, causing the LED light emitting element 11 at the recognized position to emit light, emitting the light to the four subjects, and measuring the reflected light with a38 reflectance measuring machine.

In a 14 light projection device of FIG. 11 in which an optical lens similar to that of the image analysis television camera 1 is transmitted, the LED light emitting element unit 10 is arranged at the same position as that of the image element unit 8 photographed by the image analysis television camera 1, the LED light emitting element 11 at the recognized position corresponding to the subject 4 photographed by the image analysis television camera 1 is caused to emit light, the light permeates the optical lens, is condensed on the subject 4, is irradiated, and the luminous intensity is measured by a 38 reflectance measuring machine of FIG. 11 in which the reflected light is directed in the same direction as the image analysis television camera 1.

Figure 12:
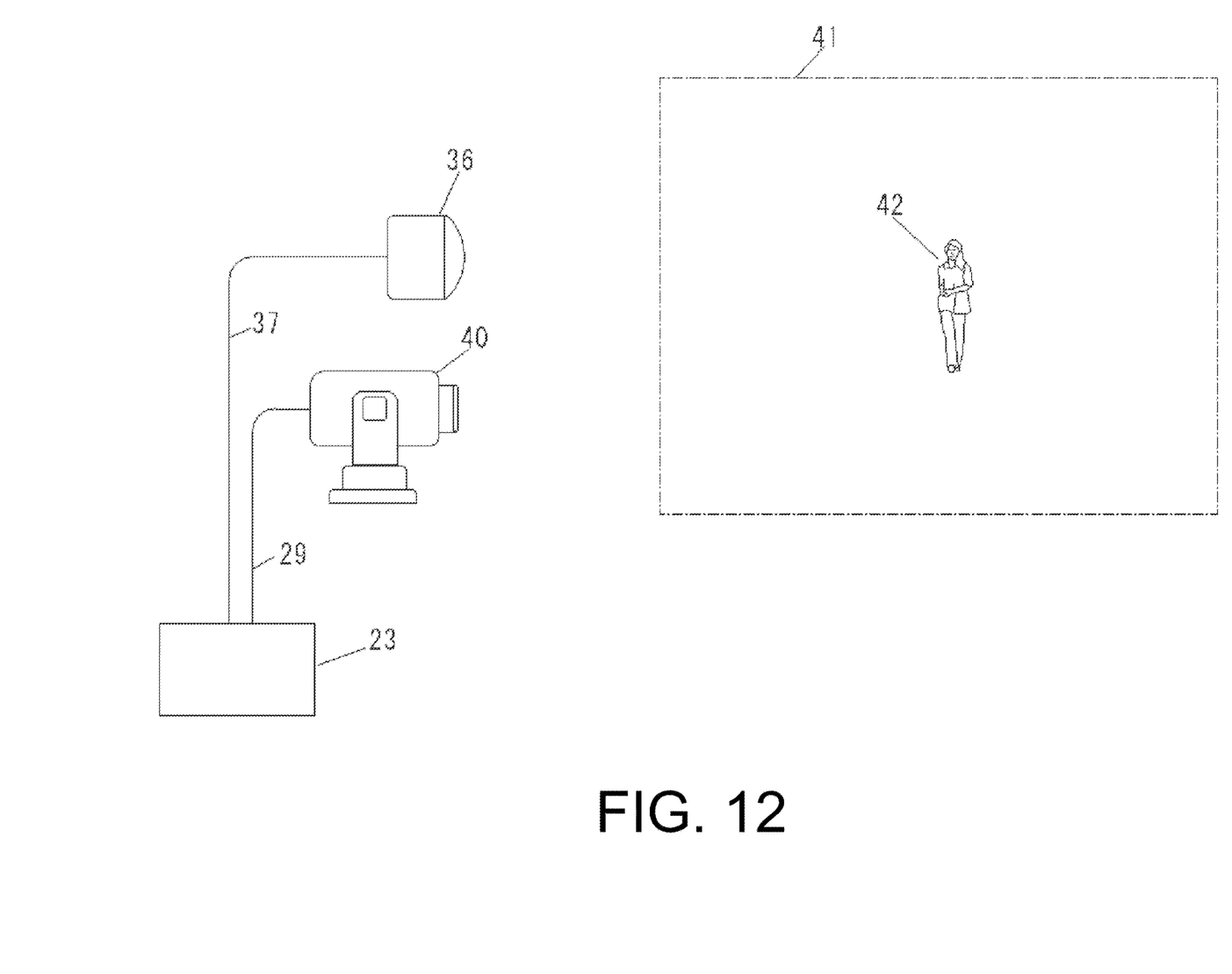
FIG. 12 shows an object of light projected from a36 LED light projecting device on a subject 42 whose luminous intensity is measured.

The 36 LED light projecting device of FIG. 12 projects the measurement range 41 of the luminous intensity measuring machine of the luminous intensity measuring device 40 of the luminous intensity measuring element.

The projected light is irradiated to the subject 42 whose luminous intensity is measured, and the reflected light permeates the optical lens of the luminous intensity measuring device 40 of the luminous intensity measuring element, and is focused on the luminous intensity measuring element unit 12 surface of the luminous intensity measuring device 40 of the luminous intensity measuring element, and appears as a real image.

Since the position in which the light is collected as a real image can be compared with the position of the subject 42 whose luminous intensity is measured, the luminous intensity of the reflected light from the position of each object can be measured.

By synchronizing the emission time of the 36 LED light projection device with the measurement time, the arrival time of the reflected light can be measured, and the distance to the subject can be calculated.

The direction in which the subject is present can be known from the measured position of the 40 light intensity measuring element on the surface of the light intensity measuring element unit 12.

Figure 13:
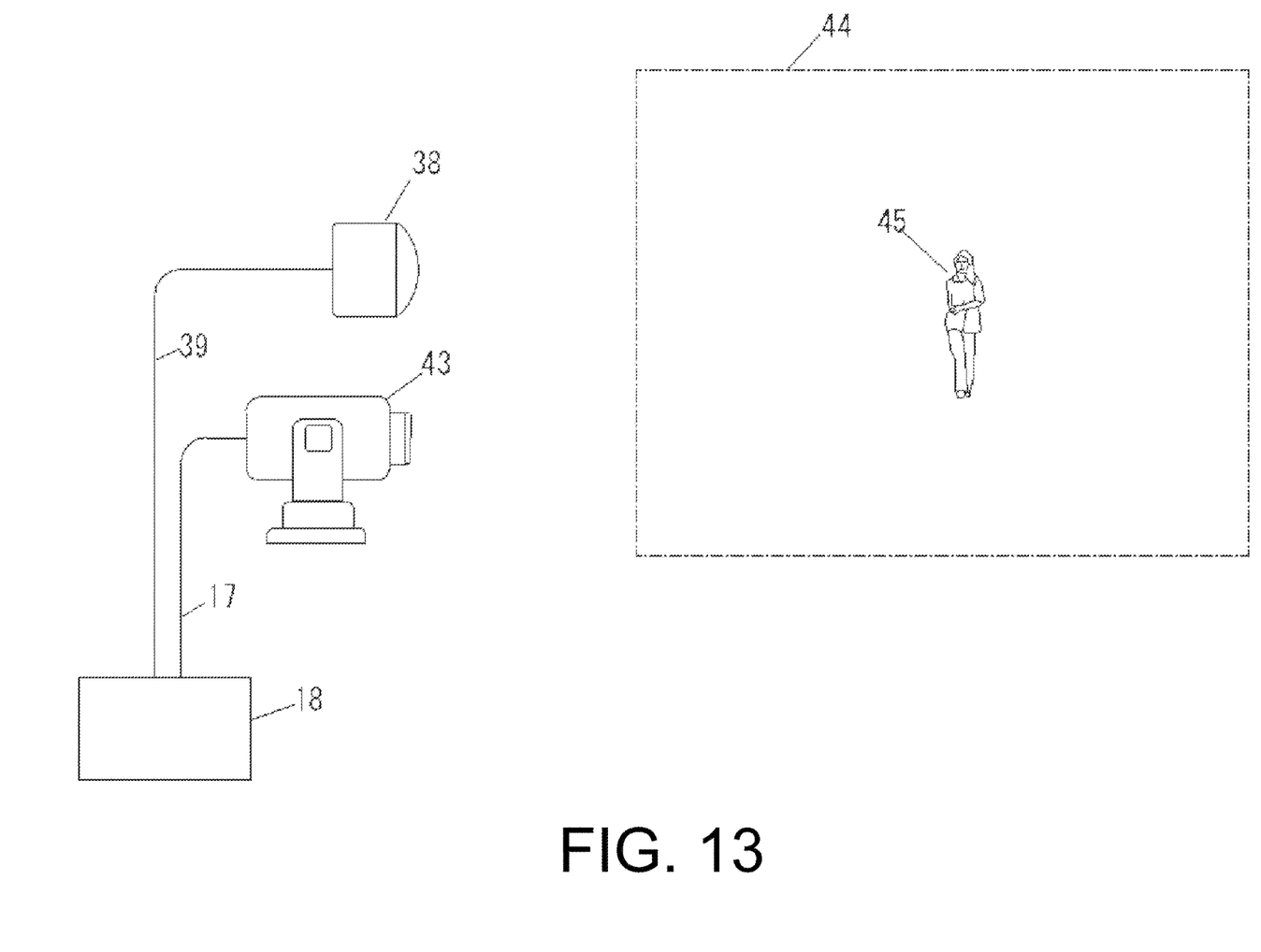
FIG. 13 is an explanatory diagram in which light is emitted for each LED light emitting element of the light projecting unit 43 of the LED light emitting element, the light is transmitted through the optical lens and irradiated toward the object of the light projecting unit of the 45 LED light emitting element, and the luminous intensity of the reflected light is measured by the reflected light measuring apparatus 38.

In the light projecting device 43 of the LED light emitting device of FIG. 13, each LED light emitting element 11 of the LED light emitting element unit 10 is individually controlled to emit light, and the light emitted at each LED light emitting element position on the surface of the LED light emitting element unit 10 permeates the optical lens of the LED light emitting element unit 10 and irradiates the object at the condensed position, and the reflected light measuring device 38 measures the luminous intensity. The distance to the object is measured from the difference between the light emission time and the time when the light intensity is measured.

Since the direction of the object can be seen from the position of the LED light emitting element on the surface of the LED light emitting element unit 10, the position of the object in the light projection range of the 44 LED light emitting element can be known.

The image of the reflected object can be recognized as a three-dimensional image to which the measured distance is added, from the positions of some of the luminous intensity measuring elements which have measured the substantially same distance calculated in the above.

As described above, the distance measurement of the position where the television camera image is analyzed, which is reflected in the range in which the image analysis television camera is photographed, is calculated in association with the recognized position of the image analysis television camera image element which reflects the position.

An LED light emitting element is caused to emit light at a position corresponding to the recognized position of an optical mechanism having a similar focal length to that of the image analysis television camera and a similar optical mechanism having the same focal length as that of the image analysis television camera, and the light is condensed and projected on the photographed position.

The reflected light projected from the position is obtained by measuring the luminous intensity of the reflected light at a position corresponding to the recognized position of an optical mechanism similar to the image analysis television camera and having a similar focal length to that of the image analysis television camera.

The optical mechanism of the image analysis television camera has an optical operation function such as a homing operation, a zoom operation, and an iris operation, and a digital electronic operation function.

In the light projection of the LED light emitting element, the light emitting element unit has a wide area for heat radiation, but the optical mechanism has the same function which is similar to the optical mechanism of the image analysis television camera at the same focal length.

The invention claimed is:

1. A distance measurement system for measuring a distance to a subject, comprising:
   an image element unit including a plurality of image elements and configured to obtain an image by photographing the subject through an optical lens;
   at least one of (i) a light emitting element unit including a plurality of light emitting elements and (ii) a light intensity measuring element unit including a plurality of light intensity measuring elements, arranged at the same as or similar to positions of the plurality of image elements; and
   a measurement unit configured to perform image recognition on the obtained image to identify light emitting elements or light intensity measuring elements corresponding to image elements by which an object has been recognized, and to perform at least one of (i) emitting the identified light emitting elements such that light emitted from the identified light emitting elements is irradiated to the object through the optical lens and (ii) receiving, by the identified light intensity measuring elements, a reflected light through the optical lens from the subject, to measure the distance to the subject.

2. The distance measuring system according to claim 1, further comprising a changing unit configured to change a light emitting position of the identified light emitting elements or a light receiving position of the identified light intensity measuring elements;
   wherein the changing unit changes the light emitting position or the light receiving position to a position where the object is recognized by the image recognition on a screen on which a television camera including the image element unit photographs the object.

3. The distance measurement system according to claim 2, further comprising a light projector configured to irradiate light toward the object based on a result of the image recognition, wherein
   the identified light intensity measuring elements receive light reflected from the light irradiated toward the object; and
   the changing unit changes the receiving position so that the light reflected from the light irradiated toward the object is condensed through the optical lens.

4. The distance measuring system according to claim 3, wherein the distance to the object is calculated based on a time from a time when the light projector irradiates the light toward the object until the light reflected from the object of the irradiated light is measured.

5. The distance measurement system according to claim 3, wherein the light emitting element unit is configured to receive the reflected light at a position guided from a positon where the object is recognized by the image recognition on a screen on which a television camera including the image element unit photographs the object.

6. The distance measuring system according to claim 1, wherein the distance to the object is calculated based on a time from a time when the identified light emitting elements emit the light until a reflected light from the object of the light is measured.

7. The distance measuring system according to claim 1, wherein the light emitting element unit is an LED light emitting element unit.

8. The distance measurement system according to of claim 1, wherein at least one of the light emitting element unit and the light intensity measuring element is arranged at a focal position of an optical lens mechanism of a television camera including the image element unit.

9. The distance measurement system according to claim 1, wherein the measurement unit further performs three-dimensional image analysis on the object captured at the measured distance.

10. The distance measurement system according to claim 1, wherein the measurement unit analyzes a three-dimensional position of the object subjected to the image recognition based on a direction in which the object is measured and a measured distance.

11. The distance measuring system according to claim 1, wherein an image of the object on a screen of a television camera including the image element unit is analyzed based on a measured direction of the object and a measured distance.

* * * * *